(12) United States Patent
Chang et al.

(10) Patent No.: US 9,212,282 B2
(45) Date of Patent: Dec. 15, 2015

(54) INTERFERENCE PIGMENT WITH HIGH COLOR INTENSITY AND METHOD OF MANUFACTURING THE SAME

(71) Applicant: CQV CO., LTD., Chungcheongbuk-do (KR)

(72) Inventors: Kil-Wan Chang, Cheongju-si (KR); Kwang-Soo Lim, Cheongju-si (KR); Byung-Ki Choi, Chungcheongbuk-do (KR); Jin-Hyoung Lee, Cheongju-si (KR)

(73) Assignee: CQV CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 14/122,856

(22) PCT Filed: Jul. 15, 2013

(86) PCT No.: PCT/KR2013/006319
§ 371 (c)(1),
(2) Date: Nov. 27, 2013

(87) PCT Pub. No.: WO2014/038784
PCT Pub. Date: Mar. 13, 2014

(65) Prior Publication Data
US 2014/0165878 A1    Jun. 19, 2014

(30) Foreign Application Priority Data

Sep. 10, 2012 (KR) .......................... 10-2012-0100042

(51) Int. Cl.
*C09C 3/00* (2006.01)
*C09C 1/00* (2006.01)

(52) U.S. Cl.
CPC .............. *C09C 1/0024* (2013.01); *C09C 1/0015* (2013.01); *C01P 2004/03* (2013.01); *C01P 2006/60* (2013.01); *C01P 2006/63* (2013.01); *C01P 2006/64* (2013.01); *C01P 2006/65* (2013.01); *C09C 2200/102* (2013.01); *C09C 2200/1004* (2013.01)

(58) Field of Classification Search
CPC ................ C09C 1/0015; C09C 1/0024; C09C 2200/1004; C09C 2200/102; C01P 2004/03; C01P 2006/60; C01P 2006/63; C01P 2006/64; C01P 2006/65
USPC ........................................................ 106/418
See application file for complete search history.

(56) References Cited

U.S. PATENT DOCUMENTS

| 7,767,214 B2 * | 8/2010 | Simon et al. .................. 424/401 |
| 2003/0064039 A1 * | 4/2003 | Kolodziej et al. ............... 424/63 |
| 2010/0175587 A1 * | 7/2010 | Rueger et al. ................. 106/403 |
| 2011/0306678 A1 * | 12/2011 | Liu et al. ........................ 514/770 |
| 2012/0227627 A1 * | 9/2012 | Jeong et al. ................... 106/417 |
| 2012/0308667 A1 * | 12/2012 | Melson et al. ................. 424/642 |

FOREIGN PATENT DOCUMENTS

| CN | 101203574 A | | 6/2008 |
| KR | 1020050032480 A | | 4/2005 |
| KR | 1020080017485 A | | 2/2008 |
| KR | 10-1135360 | * | 4/2012 |
| KR | 101135360 B1 | | 4/2012 |
| KR | 1020120043119 A | | 5/2012 |
| WO | 2011020572 A1 | | 2/2011 |

OTHER PUBLICATIONS

International Search Report for PCT/KR2013/006319 mailed on Sep. 5, 2013.
Written Opinion for PCT/KR2013/006319 mailed on Sep. 5, 2013.
Chinese Office Action dated Sep. 22, 2014.
Japanese Office Action dated Jan. 20, 2015.

* cited by examiner

*Primary Examiner* — Anthony J Green
(74) *Attorney, Agent, or Firm* — Hauptman Ham, LLP

(57) ABSTRACT

The interference pigment with high color intensity includes: a platelet-shaped substrate including at least one of natural mica, synthetic mica, alumina flakes, glass flakes, and iron oxide flakes; a lower first metal oxide layer formed of $Fe_2O_3$ on the platelet-shaped substrate; a second metal oxide layer formed of $MgO \cdot SiO_2$ on the lower first metal oxide layer; and an upper first metal oxide layer formed of $Fe_2O_3$ on the second metal oxide layer.

7 Claims, 2 Drawing Sheets

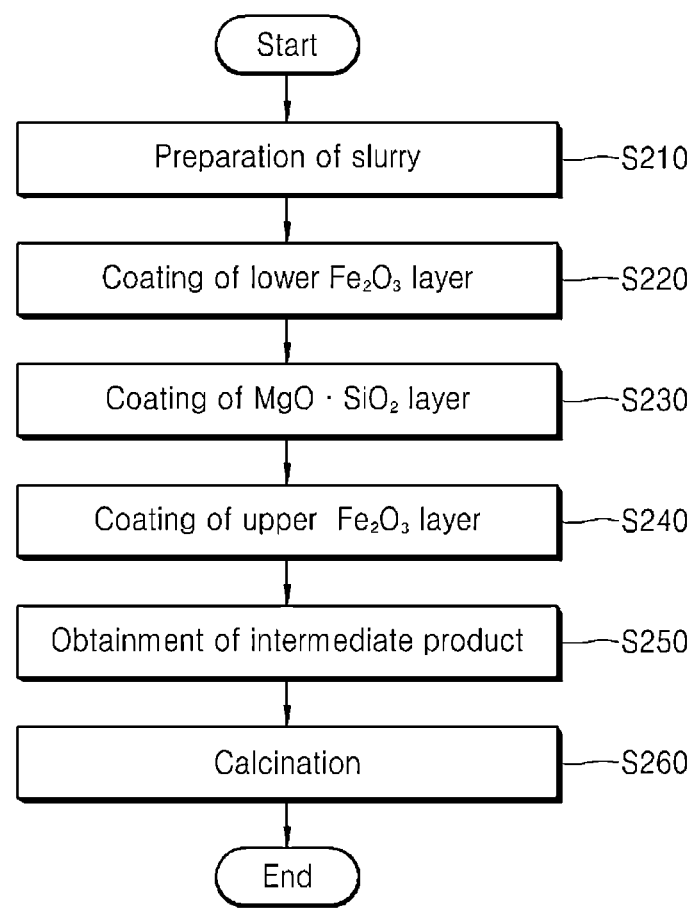

INTERFERENCE PIGMENT WITH HIGH COLOR INTENSITY AND METHOD OF MANUFACTURING THE SAME

TECHNICAL FIELD

The present invention relates to an interference pigment, more particularly, to an interference pigment having high color intensity using a difference between indexes of refraction of multiple metal oxide layers coated on a platelet-shaped substrate, and a method of manufacturing the same.

BACKGROUND ART

Gloss or effect pigments are applied to various industrial fields, particularly, to automobiles, decorative coatings, plastics, paints, printing inks, and cosmetic mixtures.

Gloss pigments based on transparent platelet-shaped substrates free from "high-contrast" metallic gloss are prepared by coating a highly refractive metal oxide layer (for example, $TiO_2$) and, optionally, an absorption layer onto mica platelets. These pigments exhibit a specific interference color depending on thickness of a $TiO_2$ layer when observed in a flat state, and the interference color gradually becomes fainter and finally changes to gray or black as viewing angle is increasingly tilted. Here, deterioration in the degree of color saturation is observed, despite no change in the interference color.

Recently, a gloss pigment, which is based on glass platelets or mica particles coated with an opaque metal layer and alternate $SiO_2$ and $TiO_2$ layers, has been developed.

However, in some cases, existing multilayer pigments known in the art are prepared from layer materials, which substantially block transmission of light or allow transmission of only a small amount of light, and thus can be combined with absorption pigments only in an extremely limited range upon coating. In addition, since the interference color of such pigments significantly depends on viewing angle, such pigments are not suited to most purposes. Further, in some cases, it is extremely difficult to prepare or recover such pigments.

In the related art, Korean Patent Publication No. 10-2008-0017485 (publication date: 2008. 02. 26) discloses an interference pigment based on glass flakes.

DISCLOSURE

Technical Problem

An aspect of the present invention is to provide an interference pigment having high color intensity by coating a layer having a low index of refraction between upper and lower layers having high indexes of refraction on a platelet-shaped substrate, and a method of manufacturing the same.

Technical Solution

In accordance with an aspect of the present invention, an interference pigment includes: a platelet-shaped substrate including at least one of natural mica, synthetic mica, alumina flakes, glass flakes and iron oxide flakes; a lower first metal oxide layer formed of $Fe_2O_3$ on the platelet-shaped substrate; a second metal oxide layer formed of $MgO\cdot SiO_2$ on the lower first metal oxide layer; and an upper first metal oxide layer formed of $Fe_2O_3$ on the second metal oxide layer.

In accordance with another aspect of the present invention, a method of manufacturing an interference pigment includes: (a) preparing a slurry by suspending a platelet-shaped substrate including at least one of natural mica, synthetic mica, alumina flakes, glass flakes and iron oxide flakes in water, followed by stirring the suspension; (b) coating a lower $Fe_2O_3$ layer onto a surface of the platelet-shaped substrate by titrating an $FeCl_3$ solution into the slurry, followed by refluxing the slurry to hydrolyze a metal salt of the $FeCl_3$ solution; (c) coating a $MgO\cdot SiO_2$ layer onto a surface of the lower $Fe_2O_3$ layer by titrating a $MgO\cdot SiO_2$ solution into the slurry after completion of (b), followed by refluxing the slurry to hydrolyze a metal salt of the $MgO\cdot SiO_2$ solution; (d) coating an upper $Fe_2O_3$ layer onto a surface of the $MgO\cdot SiO_2$ layer by repeating (b) with respect to the slurry after completion of (c); (e) obtaining a residual intermediate product by dehydrating, washing and drying the slurry after completion of (d); and (f) calcining the intermediate product.

Advantageous Effects

According to the invention, the interference pigment includes coated metal oxide layers of an $Fe_2O_3/MgO\cdot SiO_2/Fe_2O_3$ structure, which includes a layer having a low index of refraction between layers having high indexes of refraction on a platelet-shaped substrate, thereby exhibiting excellent chroma and realizing high color intensity.

BRIEF DESCRIPTION OF DRAWINGS

FIG. 2 is a flowchart of a method of manufacturing an interference pigment according to one embodiment of the present invention.

BEST MODE

Figure 1:
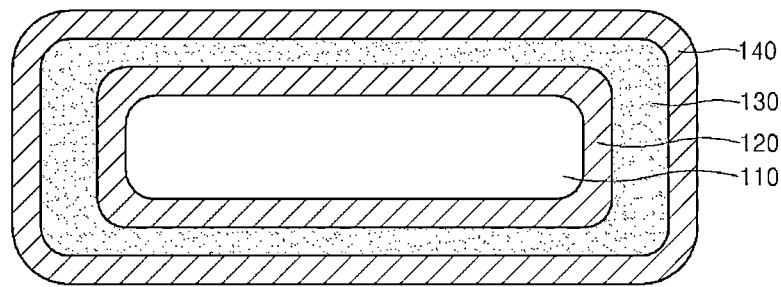
FIG. 1 is a sectional view of an interference pigment according to one embodiment of the present invention.

Hereinafter, an interference pigment having high color intensity and a method of manufacturing the same according to embodiments of the present invention will be described in detail.

FIG. 1 is a sectional view of an interference pigment according to one embodiment of the present invention.

Referring to FIG. 1, an interference pigment 100 according to the embodiment of the invention includes: a platelet-shaped substrate 110; a lower first metal oxide layer 120 formed of $Fe_2O_3$ on the platelet-shaped substrate 110; a second metal oxide layer 130 formed of $MgO\cdot SiO_2$ on the lower first metal oxide layer 120; and an upper first metal oxide layer 140 formed of $Fe_2O_3$ on the second metal oxide layer 130.

The platelet-shaped substrate 110 acts as a carrier material and may be a flake-shaped matrix, such as natural mica, synthetic mica, alumina flakes, glass flakes, iron oxide flakes, and the like. The platelet-shaped substrate may include at least one selected from thereamong.

The interference pigment 100 is prepared by coating the lower first metal oxide layer 120/the second metal oxide layer 130/the upper first metal oxide layer 140 onto the platelet-shaped substrate 110.

Here, the lower and upper first metal oxide layers 120, 140 include $Fe_2O_3$ as a main component, and have a higher index of refraction than the second metal oxide layer 130 formed of $MgO\cdot SiO_2$.

The second metal oxide layer 130 is formed of a metal oxide having an index of refraction (n) of 1.8, and may be formed of $MgO\cdot SiO_2$.

As such, the interference pigment 100 is formed by coating highly refractive/low refractive/highly refractive metal oxide layers, that is, $Fe_2O_3/MgO\cdot SiO_2/Fe_2O_3$, onto a surface of the platelet-shaped substrate 110.

According to the embodiment of the invention, since the interference pigment 100 exhibits higher chroma than existing pigments prepared by coating a single $Fe_2O_3$ layer onto a mica or glass flake matrix, as shown in Table 1, the interference pigment 100 can realize high color intensity.

Each of the lower and upper first metal oxide layers 120, 140 and the second metal oxide layer 130 may be coated to a thickness of 20 nm to 500 nm.

The interference pigment 100 exhibits different colors when observed by the naked eye depending on the sum or ratio of the lower and upper first metal oxide layers 120, 140 and the second metal oxide layer 130. However, when the thickness of the interference pigment is not within this range, it is difficult for the interference pigment 100 to exhibit a desired color.

The interference pigment 100 may be advantageously used for purposes of pearlescent pigments, for example, coloring of various paints, print inks, flooring papers, wallpapers, special papers, plastics, leathers, accessories, cosmetics, ceramic, artificial marble, and other industrial fields, and may generate high chroma colors.

FIG. 2 is a flowchart of a method of manufacturing an interference pigment according to one embodiment of the present invention.

Referring to FIG. 2, a method of manufacturing an interference pigment according to the embodiment of the invention includes: preparation of a slurry (S210); coating of a lower $Fe_2O_3$ layer (S220); coating of a MgO•$SiO_2$ layer (S230); coating of an upper $Fe_2O_3$ layer (S240); obtaining of an intermediate product (S250); and calcination (S260).

Preparation of Slurry

In preparation of a slurry (S210), a platelet-shaped substrate, which includes at least one of natural mica, synthetic mica, alumina flakes, glass flakes and iron oxide flakes, is suspended in water, for example, demineralized water, at room temperature (20~30° C.), followed by stirring the suspension, thereby preparing a slurry.

As described above, after completion of the preparation of the slurry for the pigment, first, the slurry may be heated to 60~90° C. As such, if the slurry has a temperature of less than 60° C., a subsequent coating layer can have a non-uniform coating state, and the size and shape of the coating material can become extremely irregular. In addition, if the slurry has a temperature exceeding 90° C., coating reaction violently occurs, thereby creating a coating layer with a rough surface.

Since the pigment does not exhibit high chroma when the coating layer coated onto the substrate has an unstable coating state, the temperature of the slurry is preferably maintained within the above range.

Next, after heating the slurry, an acid, for example, a hydrochloric acid (HCl) solution is added to the slurry to adjust the slurry to a pH of 2.5 to 4.0 such that $FeCl_3$ can be hydrolyzed.

Coating of Lower $Fe_2O_3$ Layer

As described above, after completion of preparation, heating and pH adjustment of the slurry, for coating a lower $Fe_2O_3$ layer (S220), an $FeCl_3$ solution is weighed such that $FeCl_3$ is present in an amount of 10% by weight (wt %) to 30 wt % in the solution, and titrated into the slurry. Upon titration of the $FeCl_3$ solution, a base, for example, an aqueous sodium hydroxide (NaOH) solution diluted to 10% to 50% is added to the slurry, and the pH of the slurry is maintained at 2.5 to 4.0. If $FeCl_3$ is present in an amount of less than 10 wt %, unit yield can be decreased, thereby causing significant deterioration in productivity. Conversely, if $FeCl_3$ is present in an amount exceeding 30 wt %, reactivity can be deteriorated, thereby providing a rough surface of the coating layer while increasing impurities.

Here, when the slurry reaches an appropriate pH, an $Fe_2O_3$ layer is coated onto the surface of the platelet-shaped substrate through hydrolysis of an $FeCl_3$ chloride (metal salt) of the $FeCl_3$ solution in an aqueous medium. Here, the $Fe_2O_3$ layer forms a lower $Fe_2O_3$ layer.

Coating of MgO•$SiO_2$ layer

In coating of a MgO•$SiO_2$ layer (S230), a MgO•$SiO_2$ solution is weighed such that MgO•$SiO_2$ is present in an amount of 2 wt % to 20 wt % in the solution, and introduced into the slurry including the lower $Fe_2O_3$ layer in order to titrate the MgO•$SiO_2$ solution. Upon titration of the MgO•$SiO_2$ solution, an acid, for example, a hydrochloric acid solution is added to the slurry, and the pH of the slurry is maintained at 5 to 9.

Next, an acid, for example, a hydrochloric acid solution is added to the slurry, and the pH of the slurry is adjusted to 2.5 to 4.0, followed by stiffing the slurry for about 10 minutes to about 1 hour while refluxing the same.

If MgO•$SiO_2$ is present in an amount of less than 2 wt %, unit yield can be decreased, thereby causing significant deterioration in productivity. Conversely, if MgO•$SiO_2$ is present in an amount exceeding 20 wt %, reactivity can be deteriorated, thereby providing a rough surface of the coating layer while increasing impurities.

In addition, if the slurry has a pH out of the above range, the MgO•$SiO_2$ layer can be abnormally coated, or the size and shape of the coating material can become non-uniform, thereby making it difficult for the pigment to have high chroma.

Here, when the slurry reaches an appropriate pH, the MgO•$SiO_2$ layer is coated onto a surface of the lower $Fe_2O_3$ layer through hydrolysis of a MgO•$SiO_2$ chloride of the MgO•$SiO_2$ solution in an aqueous medium.

Coating of Upper $Fe_2O_3$ Layer

In coating of an upper $Fe_2O_3$ layer S240, an $FeCl_3$ solution is weighed such that $FeCl_3$ is present in an amount of 10 wt % to 30 wt % in the solution, and introduced into the slurry including the MgO•$SiO_2$ layer in order to titrate the $FeCl_3$ solution. Upon titration of the $FeCl_3$ solution, a base, for example, an aqueous sodium hydroxide (NaOH) solution diluted to 10% to 50% is added to the slurry, the pH of the slurry is maintained at 2.5 to 4.0, followed by stirring the slurry for about 10 minutes to about 1 hour while refluxing the same.

Such a coating process of the upper $Fe_2O_3$ layer is performed in the same manner as in the aforementioned coating process of the lower $Fe_2O_3$ layer.

As in the above description, when the slurry reaches an appropriate pH, an $Fe_2O_3$ layer is coated onto a surface of the MgO•$SiO_2$ layer through hydrolysis of an $FeCl_3$ chloride of the $FeCl_3$ solution in an aqueous medium. Here, the $Fe_2O_3$ layer forms an upper $Fe_2O_3$ layer.

From the coating of a lower $Fe_2O_3$ layer (S220) to the coating of an upper $Fe_2O_3$ layer S240, it is desirable that each coating layer have a stable coating state by holding the slurry heated in the preparation of a slurry (S210) at a constant temperature.

Obtainment of Intermediate Product

In obtainment of an intermediate product S250, after the slurry is stirred for about 10 minutes to about 1 hour, the final slurry is filtered and subjected to dehydration and washing with demineralized water several times, followed by drying the final slurry at 80° C. to 150° C. for about 1 hour to about 20 hours, thereby obtaining an intermediate product.

Preparation of Interference Pigment

In calcination S260, the intermediate product, which is a residue obtained from the final slurry, is calcined at 600° C. to 900° C., thereby completing preparation of the interference pigment.

Here, if the calcination temperature is less than 600° C., it is difficult to obtain a desired interference pigment due to insufficient calcination, and if calcination temperature exceeds 900° C., other products can be created instead of the desired interference pigment as the substrate reaches a melting point thereof.

In this process, a metal oxide layer of an $Fe_2O_3$/$MgO \cdot SiO_2$/$Fe_2O_3$ structure is coated onto the surface of the platelet-shaped substrate, thereby forming a final interference pigment.

As described above, according to the invention, since the interference pigment has the coating layers, which are wet-chemically and easily prepared through hydrolysis of the metal salts in the aqueous media, the process of preparing the interference pigment is simple and economical.

EXAMPLES

Next, the present invention will be explained in more detail with reference to some examples. It should be understood that these examples are provided for illustration only and are not to be in any way construed as limiting the invention.

A description of details apparent to those skilled in the art will be omitted for clarity.

Example 1

100 g of synthetic mica flakes having a particle size of 5 μm to 50 μm was introduced into 2 L of demineralized water, followed by stiffing these components to prepare a slurry. Next, the slurry was heated to 75° C., and a HCl solution was added thereto when the slurry reached 75° C., thereby adjusting the pH of the slurry to 3.5. Next, 340 g of an $FeCl_3$ solution ($FeCl_3$ content: 20.0 wt %) was weighed and titrated into the slurry at a constant rate over the course of 4 hours while the pH of the slurry was maintained through addition of a 10% to 50% diluted NaOH solution. After titration of the solution, the slurry was refluxed for 10 minutes, followed by adjusting the pH of the slurry to 6.8 using a 10% to 30% diluted NaOH solution.

Next, 400 g of a $MgO \cdot SiO_2$ solution ($MgO \cdot SiO_2$ content: 15.0 wt %) was weighed and titrated into the slurry at a constant rate over the course of 1 hour while the pH of the slurry was maintained at 6.8 using the HCl solution. After the pH of the slurry is adjusted to 3.5 by adding the HCl solution thereto, the slurry was additionally stirred for 15 minutes while refluxing the same.

Next, 400 g of an $FeCl_3$ solution ($FeCl_3$ content: 20.0 wt %) was weighed and titrated into the slurry at a constant rate over the course of 5 hours while the pH of the slurry was maintained at 3.5 using a NaOH solution. After titration of the solution, the slurry was additionally stirred for 30 minutes while refluxing the same.

After refluxing the slurry, the pH of the slurry was adjusted to 8.0 to 8.5 using a 10% to 30% diluted NaOH solution, followed by refluxing the slurry for 30 minutes and stirring the same. After completion of stirring, the final slurry was filtered and subjected to dehydration and washing with demineralized water two times, followed by drying the slurry at 120° C. for 10 hours, thereby obtaining an intermediate product as a remaining material in powder form.

Finally, 11 g of the obtained intermediate product was calcined at 800° C. for 12 minutes, thereby obtaining a bronze colored powder.

Example 2

100 g of synthetic mica flakes having a particle size of 5 μm to 50 μm was introduced to 2 L of demineralized water, followed by stiffing these components, thereby preparing a slurry. Next, the slurry was heated to 75° C., and a HCl solution was added thereto when the slurry reached 75° C., thereby adjusting the pH of the slurry to 3.5. Next, 345 g of an $FeCl_3$ solution ($FeCl_3$ content: 20.0 wt %) was weighed and titrated into the slurry at a constant rate over the course of 4 hours, while the pH of the slurry was maintained through addition of a 10% to 50% diluted NaOH solution. After titration of the solution, the slurry was refluxed for 10 minutes, followed by adjusting the pH of the slurry to 6.8 using a 10% to 30% diluted NaOH solution.

Next, 450 g of a $MgO \cdot SiO_2$ solution ($MgO \cdot SiO_2$ content: 15.0 wt %) was weighed and titrated into the slurry at a constant rate over the course of 4 hours, the pH of the slurry was maintained at 6.8 using a 10% HCl solution. After the pH of the slurry was adjusted to 3.5 by adding the HCl solution thereto, the slurry was additionally stirred for 15 minutes while refluxing the same.

Next, 450 g of an $FeCl_3$ solution ($FeCl_3$ content: 20.0 wt %) was weighed and titrated into the slurry at a constant rate over the course of 5 hours while the pH of the slurry was maintained at 3.0 using a 10% to 50% diluted NaOH solution. After titration of the solution, the slurry was additionally stirred for 30 minutes while refluxing the same.

After refluxing the slurry, the pH of the slurry was adjusted to 8.0 to 8.5 using a 10% to 30% diluted NaOH solution, followed by refluxing the slurry for 30 minutes and stirring the same. After completion of stirring, the final slurry was filtered and subjected to dehydration and washing with demineralized water two times, followed by drying the slurry at 120° C. for 10 hours, thereby obtaining an intermediate product as a remaining material in powder form.

Finally, 11 g of the powder was calcined at 800° C. for 12 minutes, thereby obtaining a powder having a copper tone.

Example 3

100 g of synthetic mica flakes having a particle size of 5 μm to 50 μm was introduced into 2L of demineralized water, followed by stirring these components so as to prepare a slurry. Next, the slurry was heated to 75° C., and a HCl solution was added thereto when the slurry reached 75° C., thereby adjusting the pH of the slurry to 3.5.

Next, 600 g of an $FeCl_3$ solution ($FeCl_3$ content: 20.0 wt %) was weighed and titrated into the slurry at a constant rate over the course of 5 hours while the pH of the slurry was maintained at 3.5 using a 10% to 50% diluted NaOH solution. After titration of the solution, the slurry was refluxed for 10 minutes, followed by adjusting the pH of the slurry to 6.8 using a 10% to 30% diluted NaOH solution.

Next, 400 g of a $MgO \cdot SiO_2$ solution ($MgO \cdot SiO_2$ content: 15.0 wt %) was weighed and titrated into the slurry at a constant rate over the course of 2 hours, the pH of the slurry was maintained at 6.8 using the HCl solution. After the pH of the slurry was adjusted to 3.5 by adding the HCl solution thereto, the slurry was additionally stirred for 15 minutes while refluxing the same.

Next, 570 g of an $FeCl_3$ solution ($FeCl_3$ content: 20.0 wt %) was weighed and titrated into the slurry at a constant rate over the course of 5 hours while the pH of the slurry was maintained at 3.5 using a 10% to 50% diluted NaOH solution. After titration of the solution, the slurry was additionally stirred for 30 minutes while refluxing the same.

After refluxing the slurry, the pH of the slurry was adjusted to 8.0 to 8.5 using a 10% to 30% diluted NaOH solution, followed by refluxing the slurry for 30 minutes and stirring the same. After completion of stirring, the final slurry was filtered and subjected to dehydration and washing with demineralized water two times, followed by drying the slurry at 120° C. for 10 hours, thereby obtaining an intermediate product as a remaining material in powder form.

Finally, 11 g of the powder was calcined at 850° C. for 30 minutes, thereby obtaining a powder having a russet tone.

Example 4

100 g of glass flakes having a particle size of 15 μm to 100 μm was introduced into 2 L of demineralized water, followed by stirring these components, thereby preparing a slurry. Next, the slurry was heated to 75° C., and a HCl solution was added thereto when the slurry reached 75° C., thereby adjusting the pH of the slurry to 3.5.

Next, 250 g of an $FeCl_3$ solution ($FeCl_3$ content: 20.0 wt %) was weighed and titrated into the slurry at a constant rate over the course of 4 hours while the pH of the slurry was maintained at 3.5 using a 10% to 50% diluted NaOH solution. After titration of the solution, the slurry was refluxed for 10 minutes, followed by adjusting the pH of the slurry to 6.8 using a 10% to 30% diluted NaOH solution.

Next, 280 g of a MgO•$SiO_2$ solution (MgO•$SiO_2$ content: 15.0 wt %) was weighed and titrated into the slurry at a constant rate over the course of 6 hours while the pH of the slurry was maintained at 3.5 using a 10% diluted HCl solution. The HCl solution was then added to the slurry, thereby adjusting the pH of the slurry to 3.5.

Next, 400 g of an $FeCl_3$ solution ($FeCl_3$ content: 20.0 wt %) was weighed and titrated into the slurry at a constant rate over the course of 5 hours while the pH of the slurry was maintained at 3.5 using a 10% to 50% diluted NaOH solution. After titration of the solution, the slurry was additionally stirred for 30 minutes while refluxing the same.

After completion of refluxing, the final slurry was filtered and subjected to dehydration and washing with demineralized water two times, followed by drying the slurry at 120° C. for 10 hours, thereby obtaining an intermediate product which as a remaining material in powder form.

Finally, 11 g of the powder was calcined at 600° C. for 12 minutes, thereby obtaining a powder having a russet tone.

Example 5

100 g of glass flakes having a particle size of 20 μm to 200 μm was introduced into 2L of demineralized water, followed by stirring these components, thereby preparing a slurry. Next, the slurry was heated to 75° C., and a HCl solution was added thereto when the slurry reached 75° C., thereby adjusting the pH of the slurry to 3.5.

Next, 300 g of an $FeCl_3$ solution ($FeCl_3$ content: 20.0 wt %) was weighed and titrated into the slurry at a constant rate over the course of 4 hours while the pH of the slurry was maintained at 3.5 using a 10% to 50% diluted NaOH solution. After titration of the solution, the slurry was refluxed for 10 minutes, followed by adjusting the pH of the slurry to 6.8 using a 10% to 30% diluted NaOH solution. Next, 300 g of a MgO•$SiO_2$ solution (MgO•$SiO_2$ content: 15.0 wt %) was weighed and titrated into the slurry at a constant rate over the course of 6 hours while the pH of the slurry was maintained at 3.5 using a 10% diluted HCl solution. The HCl solution was added to the slurry, thereby adjusting the pH of the slurry to 3.5.

Next, 500 g of an $FeCl_3$ solution ($FeCl_3$ content: 20.0 wt %) was weighed and titrated into the slurry at a constant rate over the course of 5 hours while the pH of the slurry was maintained at 3.5 using a 10% to 50% diluted NaOH solution. After titration of the solution, the slurry was additionally stirred for 30 minutes while refluxing the same.

After completion of refluxing, the final slurry was filtered and subjected to dehydration and washing with demineralized water two times, followed by drying the slurry at 120° C. for 10 hours, thereby obtaining an intermediate product as a remaining material in powder form.

Finally, 11 g of the powder was calcined at 600° C. for 12 minutes, thereby obtaining a powder having a russet tone.

Evaluation of Chroma

Table 1 shows color space values (a*, b*) of interference pigments prepared in Examples 1 to 5. The color space values were measured using a Konica Minolta Chroma meter CR-400 D65. Here, a* is the degree of red, b* is the degree of yellow, and Δa* and Δb* are changes in color space values between the pigments of Examples and Comparative Examples, which have the same substrate and color.

According to the invention, the interference pigments relate to colors between yellow and red based on the color space values. Higher Δa* and Δb* indicate higher chroma.

TABLE 1

| Comparative Example | a* | b* | | a* | b* | Δa* | Δb* |
|---|---|---|---|---|---|---|---|
| R-630K | 15.45 | 32.77 | Example 1 | 25.87 | 49.81 | +10.42 | +17.04 |
| R-640K | 30.22 | 28.30 | Example 2 | 35.74 | 37.20 | +5.52 | +8.90 |
| R-660K | 34.93 | 14.33 | Example 3 | 37.93 | 22.73 | +3.00 | +8.40 |
| AX-660E | 15.64 | 6.16 | Example 4 | 23.82 | 12.24 | +8.18 | +6.08 |
| AX-660G | 15.51 | 5.95 | Example 5 | 19.87 | 10.20 | +4.36 | +13.92 |

Here, the pigments of Comparative Examples are products prepared by coating an $Fe_2O_3$ single layer onto a mica matrix or a glass flake matrix, and details are as follows:

1) R-620K: Powder of a bronze color using a mica matrix;
2) R-640K: Powder of a copper color using a mica matrix;
3) R-660K: Powder of a russet color using a mica matrix;
4) AX-660E: Powder of a russet color using a glass flake matrix; and
5) AX-660G: Powder of a russet color using a glass flake matrix.

In addition, the pigments of Examples 1 to 5 were powder coated with an $Fe_2O_3$/MgO•$SiO_2$/$Fe_2O_3$ multilayer structure, and details are as follows:

Example 1: Powder of a bronze color using a mica matrix;
Example 2: Powder of a copper color using a mica matrix;
Example 3: Powder of a russet color using a mica matrix;
Example 4: Powder of a russet color using a glass flake matrix; and
Example 5: Powder of a russet color using a glass flake matrix.

Here, color names of bronze, copper and russet are defined as follows:
Bronze: A medium color between yellow and orange;
Copper: A medium color between orange and red; and
Russet: A medium color between red and violet.

Referring to Table 1, from comparison of the results between the pigments of Examples 1 to 5 and Comparative Examples, it can be seen that the color space values (a*, b*) were increased after using a coating layer of the $Fe_2O_3$/MgO•$SiO_2$/$Fe_2O_3$ structure.

Here, since chroma increases with increasing absolute value of the colorimeter value, it can be seen that the pigments prepared in Examples 1 to 5 had improved chroma.

[Application]

Next, examples, in which the interference pigments obtained in Examples 1 to 5 were applied to paints, plastics, inks and cosmetics, will be described.

(1) Example of Pigment Applied to Paint

In this example, the interference pigment was applied to a coating paint for surfaces of automobiles.

{Basic Paint Composition}

[Polyester Resin]

Hi-Q base for mixing colors, transparent (BC-1000, NOROO Paint & Coatings Co., Ltd.)

Hi-Q LV thinner (DR-950WS, NOROO Paint & Coatings Co., Ltd.)

4 parts by weight of each of the high chroma interference pigments obtained in Examples 1 to 5 and 96 parts by weight of the polyester resin composition were mixed, and 100 parts by weight of a thinner for the polyester resin was added to the mixture to reduce viscosity to a concentration suitable for spray coating (applied at 25° C. for 14~16 seconds using a Ford Cup #4), followed by coating the resulting material by spray coating, thereby forming a lower coating layer. An uncolored transparent surface paint of the following composition was coated onto the lower coating layer.

{Transparent Surface Paint}

Hi-Q ultraclear (NOROO Paint & Coatings Co., Ltd.)

Hi-Q ultraclear curing agent (CCH-100, NOROO Paint & Coatings Co., Ltd.)

After surface coating, the paint was exposed to air at 40° C. for 30 minutes, followed by holding the paint at 130° C. for 30 minutes for curing.

(2) Example of Pigment Applied to Plastic

A pigment composition used in coloring plastics is as follows:

Polyethylene resin (pellets): 70 parts by weight;
Each of the high chroma interference pigments obtained in Examples 1 to 5: 1 part by weight;
Zinc stearate: 0.2 parts by weight; and
Liquid paraffin: 0.1 parts by weight.

Pellets including the composition were dry-blended and subjected to extrusion.

(3) Example of Pigment Applied to Cosmetic

Lipstick composition: color cosmetics are as follows:
Hydrogenated Castor Oil: 37 parts by weight;
Octyldodecanol: 10 parts by weight;
Diisostearyl Malate: 20 parts by weight;
Ceresin: 5 parts by weight;
Euphorbia Cerifera (Candelilla) Wax: 5 parts by weight;
Dipentaerythritol Hexahydroxystearate/Hexastearate/Hexarosinate: 18.5 parts by weight;
Copernicia Cerifera (Carnauba) Wax: 3 parts by weight;
Isopropyl Lanolate: 1 part by weight;
VP/Hexadecene Copolymer: 1 part by weight;

Each of the high chroma interference pigments obtained in Examples 1 to 5 and coloring material: appropriate amount; and Antioxidant, Preservative and Air freshener: small amounts.

A lipstick was produced from the composition.

Although the present invention has been described with reference to some embodiments in conjunction with the accompanying drawings, it should be understood that the foregoing embodiments are provided for illustrative purposes only and are not to be in any way construed as limiting the present invention, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. A method of preparing an interference pigment, comprising:
   (a) preparing a slurry by suspending a platelet-shaped substrate comprising at least one of natural mica, synthetic mica, alumina flakes, glass flakes and iron oxide flakes in water, followed by stiffing the suspension;
   (b) coating a lower $Fe_2O_3$ layer onto a surface of the platelet-shaped substrate by titrating an $FeCl_3$ solution into the slurry, followed by refluxing the slurry to hydrolyze a metal salt of the $FeCl_3$ solution;
   (c) coating a MgO•$SiO_2$ layer onto a surface of the lower $Fe_2O_3$ layer by titrating a MgO•$SiO_2$ solution into the slurry after completion of (b), followed by refluxing the slurry to hydrolyze a metal salt of the MgO•$SiO_2$ solution;
   (d) coating an upper $Fe_2O_3$ layer onto a surface of the MgO•$SiO_2$ layer by repeating (b) with respect to the slurry after completion of (c);
   (e) obtaining a residual intermediate product by dehydrating, washing and drying the slurry after completion of (d); and
   (f) calcining the intermediate product,
   wherein each of the lower and upper $Fe_2O_3$ layers and the MgO•$SiO_2$ layer has a thickness of 20 nm to 500 nm.

2. The method according to claim 1, wherein the slurries of (a) to (d) are maintained at 60° C. to 90° C.

3. The method according to claim 1, wherein the slurry of (b) or (d) is adjusted to a pH of 2.5 to 4.0.

4. The method according to claim 1, wherein, upon titration, the pH of the slurry of (c) is maintained at 5 to 9, and is then adjusted to 2.5 to 4.0.

5. The method according to claim 1, wherein the calcination is performed at 600° C. to 900° C.

6. The method according to claim 1, wherein, in the $FeCl_3$ solution, $FeCl_3$ is present in an amount of 10 wt % to 30 wt %.

7. The method according to claim 1, wherein in the MgO•$SiO_2$ solution, MgO•$SiO_2$ is present in an amount of 2 wt % to 20 wt %.

\* \* \* \* \*